April 7, 1953        J. W. BAUM        2,633,659
FISH LURE
Filed Aug. 26, 1949                                2 SHEETS—SHEET 1
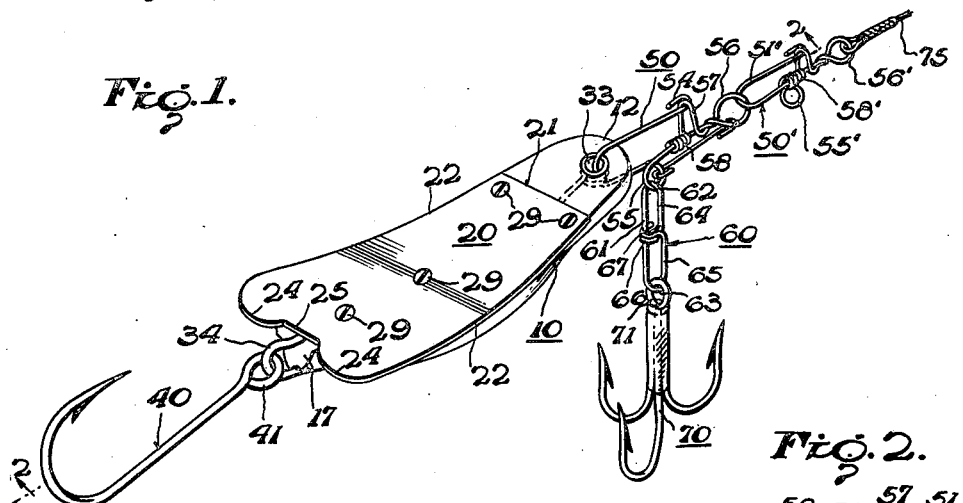
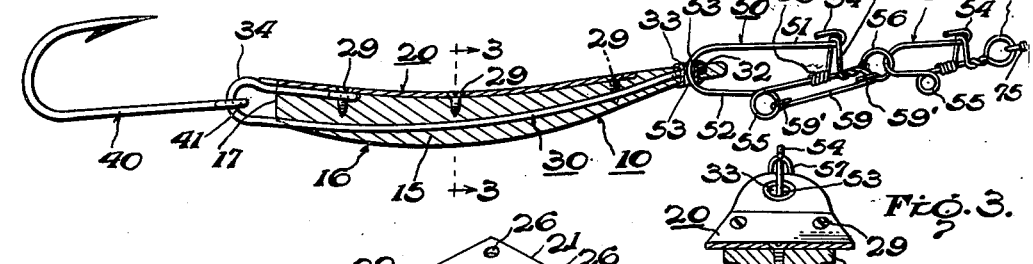
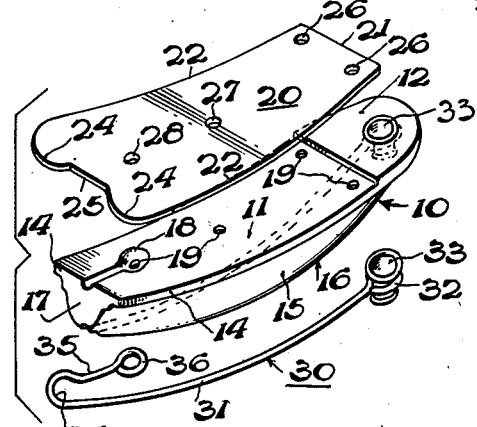
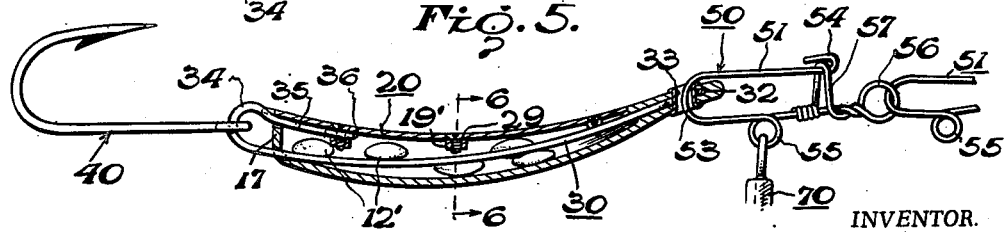
INVENTOR.
John W. Baum.
BY
ATTORNEY April 7, 1953 J. W. BAUM 2,633,659
FISH LURE
Filed Aug. 26, 1949 2 SHEETS—SHEET 2
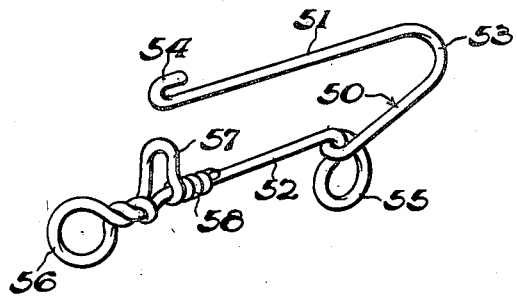
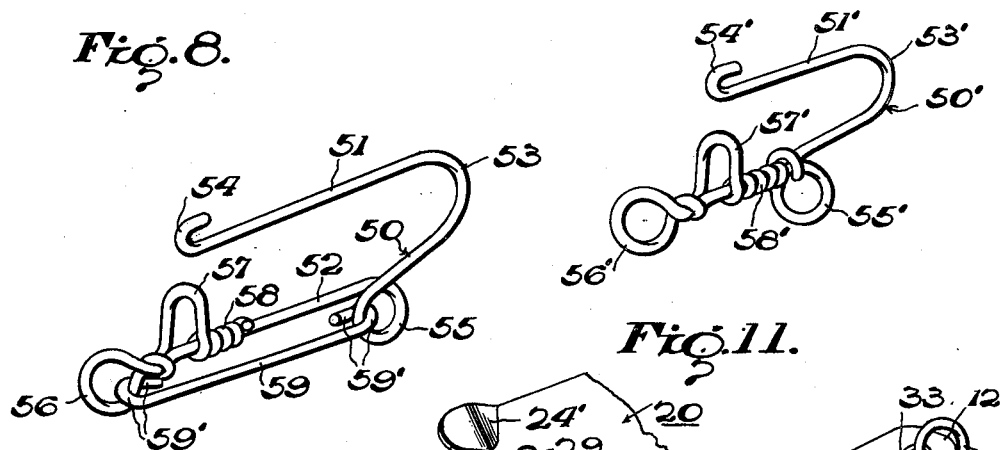
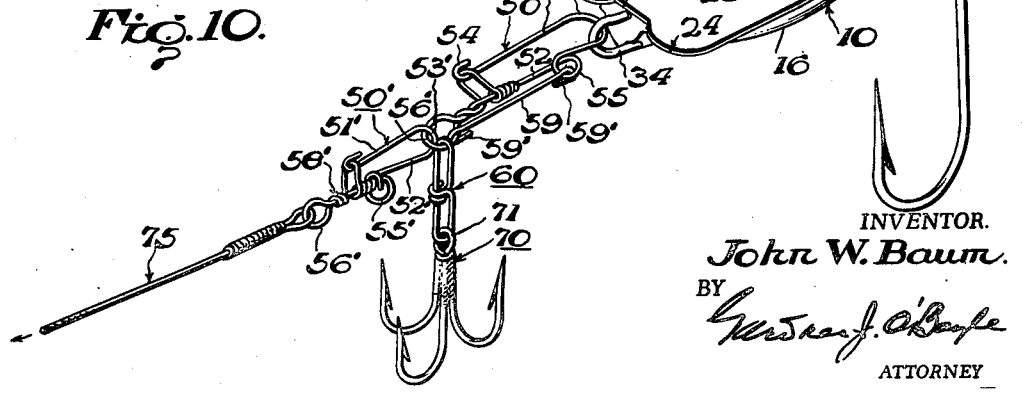
INVENTOR.
John W. Baum.
BY
ATTORNEY Patented Apr. 7, 1953

2,633,659

UNITED STATES PATENT OFFICE 2,633,659

FISH LURE

John W. Baum, Newport, Oreg.

Application August 26, 1949, Serial No. 112,451

3 Claims. (Cl. 43—42.22)

This invention relates to improvements in fish lures and to combination line connections and hook hangers or harnesses therefor. More particularly, the invention relates to double-ended fish lures which are specially adapted for use in hand line fishing for large fish such as Chinook salmon and the like. The novel structure herein is essentially comprised of a suitably configured and hydrodynamically stream-lined body portion of wood, plastic or metal, and incorporating a heavy duty wire connector having one end secured to an eyelet and the other end formed as a ring, both the eyelet and the ring optionally serving as line connector and rear hook holder, respectively, and vice versa. Additionally, the novel lure structure includes a detachable stabilizing plate of metal or plastic whose rear end can be variably spaced from the body to give special effects in operation, or the plate can be formed with special lifting vanes.

In addition to the novel one-piece body portion of the lure, together with the strengthening and load-carrying wire insert, plus a detachable stabilizing plate, the novel structure of the present invention comprehends special link connectors between the line and the lure, which connections are detachable and serve as auxiliary hook supports or as intermediate chain or link members. With the novel link construction in association with either end of the special lure body, a fish lure is provided which gives a darting, side to side action, together with a vertical up and down diving or swinging motion, and without the use of conventional swivel connectors or other special linkages. The special features of novelty and advantage of the fish lure of the present invention will be more clearly understood by reference to the accompanying drawing in which like numerals refer to similar parts throughout the several views, of which Figure 1 is a perspective view of the novel fish lure and attachments associated with a trolling line;

Fig. 2 is a longitudinal vertical section through the lure taken on line 2—2 of Fig. 1;

Fig. 3 is a transverse section taken on line 3—3 of Fig. 2.

Fig. 4 is an exploded view of the body of the lure as shown in Figs. 1 and 2;

Fig. 5 is a view similar to Fig. 3 showing a modified weighted metal body;

Fig. 6 is a transverse cross-section taken on line 6—6 of Fig. 5 with the weights omitted;

Figs. 7, 8 and 9 are enlarged detailed views in elevation of the special link connectors and hook holders;

Fig. 10 is a view similar to Fig. 1 showing the lure reversed, with the leader connected to the ring at the rear end of the lure and the fishing hook connected in the eyelet at the other end, and Fig. 11 is a broken perspective of a modified form of stabilizer plate for use in the lure of Fig. 10, and showing raised lobes serving as lifting vanes.

The novel fish lure herein comprises a plastic, wood or metal body portion 10, a detachable stabilizer plate 20, a hook supporting body and stabilizing wire leader 30. The stabilizer plate 20 may be made of any suitably colored plastic material, brass, nickel or copper and in any suitable finish, depending upon the particular fishing conditions to be encountered. The body 10 of the lure comprises an upper deck section 11 with a raised front or prow section 12. The front prow section is provided with an axial eyelet 33, a marginal edge or gunwale section 14, and a depending body section 15. The body section 15 has a keel 16 and is hydrodynamically balanced and bilaterally streamlined. The wire 30 comprises an elongated body section 31 extending substantially the length of the lure 10 and provided at its forward end with a loop 32 engaging the eyelet 33. At the rear end, the wire is provided with a hook-receiving loop 34 which continues forwardly at 35 to form a closed loop or eye 36. Where the body of the lure 10 is made of plastic, the wire 30 and eyelet 33 will be molded in place as inserts. It is noted that the hook receiving loop 34 extends beyond the truncated rear end 17 of the lure body 10. The deck or upper surface 11 of the lure 10 is grooved as indicated at 18 to receive and seat the loop or eyelet 36 and connecting leg 35 of the connector wire 30. The stabilizer plate 20 has a forward edge 21, rearwardly flaring, symmetrical sides 22, terminating in curvilinear lobes 24 joined by a transverse central section 25. The lobes 24 may be raised to form lifting vanes, 24', as shown in Fig. 11. The plate 20 is provided with forward holes 26, a centrally aligned middle hole 27, and a rear hole 28. These holes are severally in register with tapped brass nut inserts 19 embedded in the upper surface 11 of the lure body 10. The plate 20 is slightly curved, as shown, to conform to the surface 11 of the body 10 and when fitted thereon, the forward edge engages the step formed by the raised platform section 12, and the plate is secured in place by screws 29, as shown. Because of the special curvilinear configuration of the lure and its stabilizing surface, special surfboard effects are obtained when the lure is trolled at the end of the fishing lure line. These effects are characterized by a darting, plunging vertical motion, coupled with an oscillating side to side swing which is also characteristic of the action of a frightened fish. The amount or extent of vertical movement, that is, diving, may be varied by unfastening the rear screw and moving the end section 25 of the stabilizer plate up from the body of the lure as by means of a match, metal washer, or any suitable insert. The hook 40 is secured on the loop 34 of wire 30 by detaching plate 20, springing end 35 and eyelet 36 out of the groove 18, and sliding eyelet 41 of the hook over the eyelet and shank 35 on to loop 34. The eyelet 36 is re-set and the stabilizing plate 20 re-fastened. It will be seen that the hook 40 is freely movable about the loop 34 as a pivot and will be snapped sideways as well as up and down by the darting action or oscillation of the lure in its forward travel. With the leader reversed, as shown in Fig. 10, and the fish hook 40 secured through eyelet 33, the surfboard action is greatly enhanced and the lure becomes especially effective for trolling for Chinook salmon and other large fish. With the lobes 24 off-set from the surface of member 20, by being provided with raised sections 24', forming lifting vanes, or elevators, as shown in Fig. 11, the surfboard action of the lure is very much increased and exceptionally good results are obtained in use.

Special features of the invention herein are the combination line connectors and link members 50. Turning now to Figs. 1, 2, 7, 8 and 9, a preferred novel connector 50 will be seen to comprise a spring wire member having spaced legs 51, 52 joined by loop 53 and forming a generally U-shaped structure. The free end of leg 51 is looped rearwardly as indicated at 54 to form a hook. The leg 52 is provided with a central twisted loop or eyelet 55, and at its end is twisted and looped to form eyelet 56. The wire is continued rearwardly and spaced outwardly as at 57 to form a second loop or eyelet, on the opposite side of the wire from eyelet 55 and at right angles thereto. The terminal end of the wire 58 is wound around the upper end of leg 52, as shown. A bracing member or strut 59, comprised of a straight wire with hooks 59' at both ends, is connected in and between the eyelets 55, 56, forming a direct connection or brace, and relieving the strain or tension on eyelet 57, by connecting it directly through link 59 and eyelet 55 to the end loop or hook section 53, which section has bearing engagement with the eyelet 33 of the lure. In this manner the tension of the line 75 is transmitted through the first link 50', and then through the second link 50. In the form shown at 50' in Fig. 1, the terminal coils of the wire 58' extend into the eyelet 55'.

A second form or jumper wire or connector 60 comprises a double-end length of wire having a continuous side 61, looped and bent over to form end loops 62, 63. The loops 62, 63 are extended inwardly and centrally of the jumper to form legs 64, 65, respectively, which legs are bent at right angles, the ends terminating in semi-loops or hooks 66, 67, respectively. It will be noted that the hooks 66, 67 engage leg 61 from opposite sides and that these hooks severally extend beyond the center of the jumper so as to overlap each other and provide two essentially distinct hooks 62, 63. In Fig. 1, a three-pronged fish hook 70 is shown attached by its eyelet 71 to the jumper 60.

Referring now to Figs. 5 and 6, a modified form of the lure is shown in which the body 10' is pressed or stamped out of metal, and incorporates transverse stays 11', tapped as indicated at 19', to receive the usual securing screws 29. The hollow space of lure 10' may be filled with lead or other suitable weighting material, either as a casting, or in the form of suitable slugs or pellets, all as indicated generally at 12'.

It will now be appreciated there has been provided a novel, double-ended fish lure especially adapted for heavy duty line fishing for salmon and other game fish, which is characterized by a novel lure body which is free from any tendency to rotate or spin, and which is characterized by the normal darting action of a frightened fish, which action can be varied by elevating the lobed end of the stabilizing plate or raising the lobes, as well as by offsetting the forward eyelet 13 to one side or the other of the central line. It will also be appreciated that there have been provided novel wire link connectors for the fishing line, which comprise a self-locking spring wire connector having an intermediate loop serving a point of attachment for a jumper or other hook harness for a fish hook.

I claim:

1. A fish lure comprising a body of stream-lined contour having a bowed ventral surface and a stepped, dorsal surface bowed intermediate the head and tail, an eyelet in the head section, a connecting shank comprising a bowed stiffening and tension-carrying wire member secured to the eyelet and extending through the body and beyond the tail, the tail end of the wire being reversely bent to form a hook-receiving loop and a terminal eyelet spaced from the loop, means in the dorsal surface of the tail section to seat the terminal eyelet and a portion of said connecting shank, a stabilizer plate detachably secured to the stepped dorsal surface, the said plate being provided with bilateral fins which extend beyond the tail section of the body, and means to detachably secure the said plate on the lure body so that it will conform thereto, at least one of said securing means serving to conjointly engage and secure the terminal eyelet of the stiffener and the cooperating section of the stabilizer plate.

2. A fish lure comprising a plastic body of stream-lined contours having a bowed ventral surface and a stepped, dorsal surface bowed intermediate the head and tail, an eyelet in the head section, a connecting shank comprising a bowed stiffening and tension-carrying wire member secured to the eyelet and embedded in and extending through the body and beyond the tail, the tail end of the wire being reversely bent to form a hook-receiving loop and a terminal eyelet spaced from the loop, means in the dorsal surface of the tail section to seat the terminal eyelet and a portion of the connecting shank, a stabilizer plate secured to the stepped dorsal surface, the said plate being provided with bilateral fins which extend beyond the tail section of the body, and means to detachably secure the said plate on the lure body so that it will conform thereto, at least one of said securing means serving to conjointly engage and secure the terminal eyelet of the stiffener and the cooperating section of the stabilizer plate.

3. A fish lure comprising a hollow body of stream-lined contour having a bowed ventral surface and a stepped, dorsal surface bowed intermediate the head and tail, an eyelet in the head section, a connecting shank comprising a bowed stiffening and tension-carrying wire member secured to the eyelet and extending through the body and beyond the tail, the tail end of the wire being reversely bent to form a hook-receiving loop and a terminal eyelet spaced from the loop, means in the dorsal surface of the tail section to seat the terminal eyelet and a portion of said connecting shank, a stabilizer plate secured to the stepped dorsal surface, the said plate being provided with bilateral fins which extend beyond the tail section of the body, and means to detachably secure the said plate on the lure body so that it will conform thereto, at least one of said securing means serving to conjointly engage and secure the terminal eyelet of the stiffener and the cooperating section of the stabilizer plate, and weighting means in the hollow portion of said body.

JOHN W. BAUM.

REFERENCES CITED

The following references are of record in the file of this patent:

UNITED STATES PATENTS

| Number | Name | Date |
|---|---|---|
| D. 139,655 | Jorgensen | Dec. 5, 1944 |
| 745,131 | Abbath | Nov. 24, 1904 |
| 766,638 | Martin | Aug. 2, 1904 |
| 1,709,010 | Foss | Apr. 16, 1929 |
| 1,728,560 | Goshorn | Sept. 17, 1929 |
| 1,855,097 | Chamberlaine | Apr. 19, 1932 |
| 1,888,641 | Toepper | Nov. 22, 1932 |
| 2,038,127 | Pfleuger | Apr. 21, 1936 |
| 2,187,475 | Lauby | Jan. 16, 1940 |
| 2,335,322 | Taylor | Nov. 30, 1943 |
| 2,480,580 | Hopkins | Aug. 30, 1949 |
| 2,512,914 | Boice | June 27, 1950 |